United States Patent [19]
Hensley et al.

[11] 3,768,846
[45] Oct. 30, 1973

[54] INTERLOCKING JOINT

[76] Inventors: Raymond Hensley; Ida F. Hensley, both of 2314 Roscomare Rd., Los Angeles, Calif. 90024

[22] Filed: June 3, 1971

[21] Appl. No.: 149,723

[52] U.S. Cl............... 52/758 D, 46/31, 138/168, 285/424, 52/594
[51] Int. Cl.............................................. F16b 5/07
[58] Field of Search.......... 287/189.36 D, 189.36 R, 287/20.92 T, 20.92 C, 20.92 D, 20.92 K, 20.92 R; 52/593, 594, 582, 285; 220/80; 217/12 R, 69; 46/30, 31; 138/167, 168; 285/424; 211/177, 182

[56] References Cited
UNITED STATES PATENTS

| | | | |
|---|---|---|---|
| 3,362,739 | 1/1968 | Staeger et al...................... | 52/285 |
| 2,565,610 | 8/1951 | Kinghorn...................... | 285/424 X |
| 2,749,155 | 6/1956 | Kinghorn et al................ | 285/424 X |
| 1,934,330 | 11/1933 | Ruppelt............................. | 138/168 |
| 3,460,860 | 8/1969 | Stevens....................... | 287/20.92 R |
| 2,457,002 | 12/1948 | Spiro........................... | 287/20.92 D |
| 2,791,807 | 5/1957 | Morin........................... | 287/20.92 T |
| 3,211,322 | 10/1965 | Collons............................. | 220/42 C |
| 3,460,282 | 8/1969 | Swirsky........................... | 46/31 UX |
| 3,480,312 | 11/1969 | Meredith........................... | 46/31 X |

FOREIGN PATENTS OR APPLICATIONS
1,309,421   8/1962   France............................... 220/80

*Primary Examiner*—Jordan Franklin
*Assistant Examiner*—Wayne L. Shedd
*Attorney*—Gausewitz, Carr & Rothenberg

[57] ABSTRACT

A joint construction including a first member having an inclined ramp inwardly of a rounded outer edge, with a flat surface at the upper end of the ramp and a shoulder rearwardly of the flat surface, the second portion of the joint including parallel flanges defining an opening, one of the flanges having a flat surface adjacent the other, the other flange having a thick portion at its inner end to define a narrower portion of the opening, a bendable intermediate portion and a bead at the outer end having a beveled outer surface, a rounded edge and an inner shoulder adapted to lock with the shoulder of the first member when the joint is assembled. An inwardly and rearwardly inclined lip on the deflectable flange helps align the parts. Means for holding the shoulders in a separated condition may be included for permitting release of the joint.

24 Claims, 23 Drawing Figures

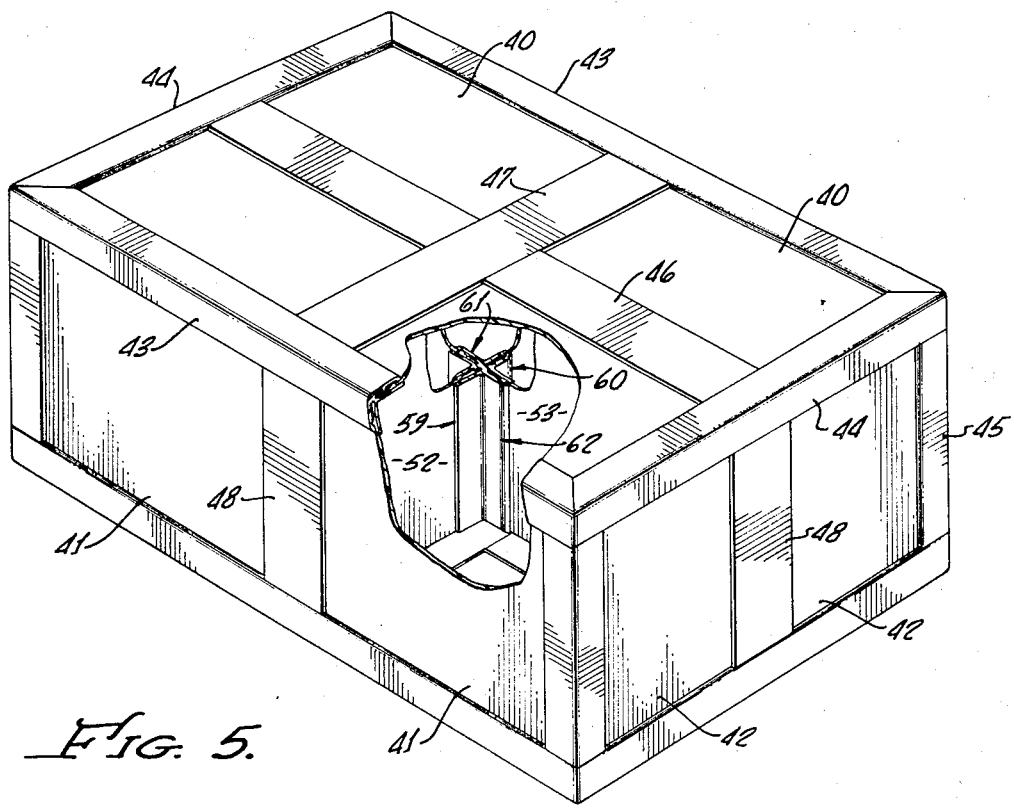
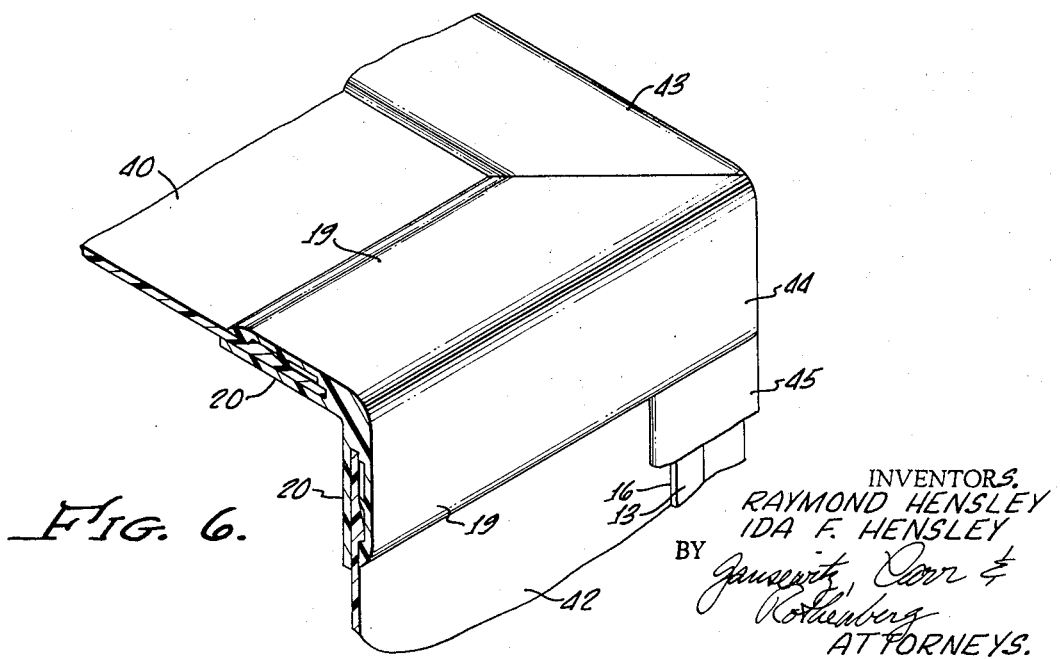

INVENTORS.
RAYMOND HENSLEY
IDA F. HENSLEY
ATTORNEYS.

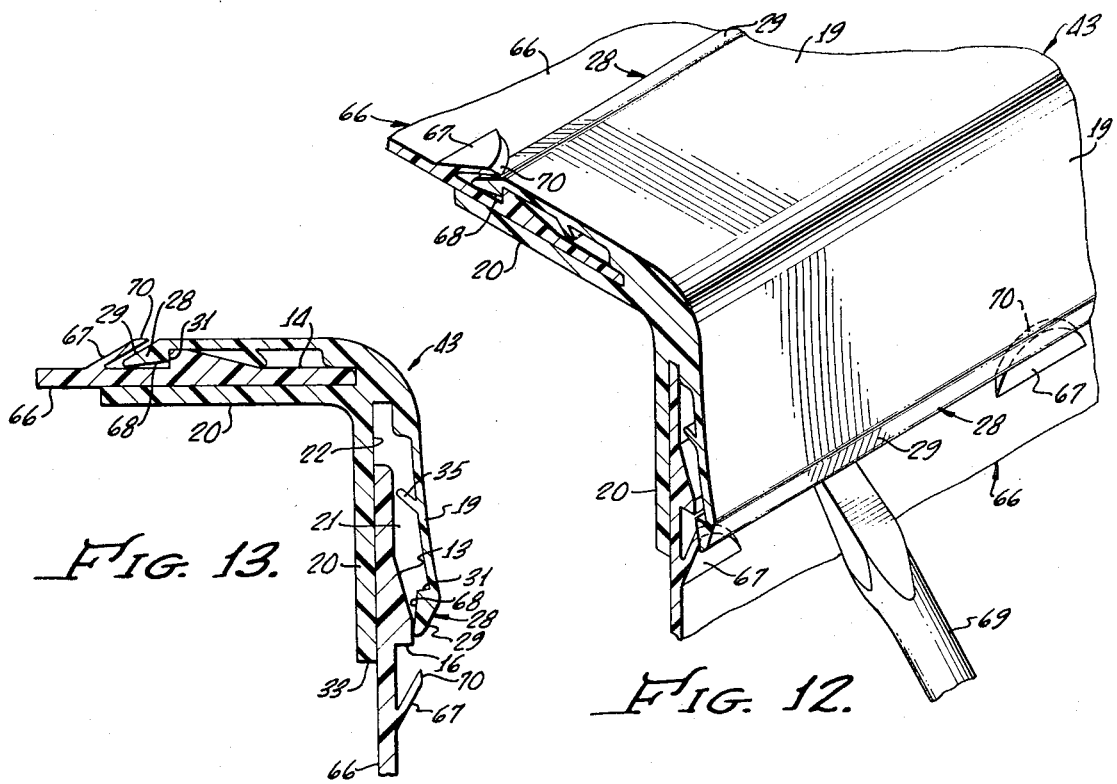

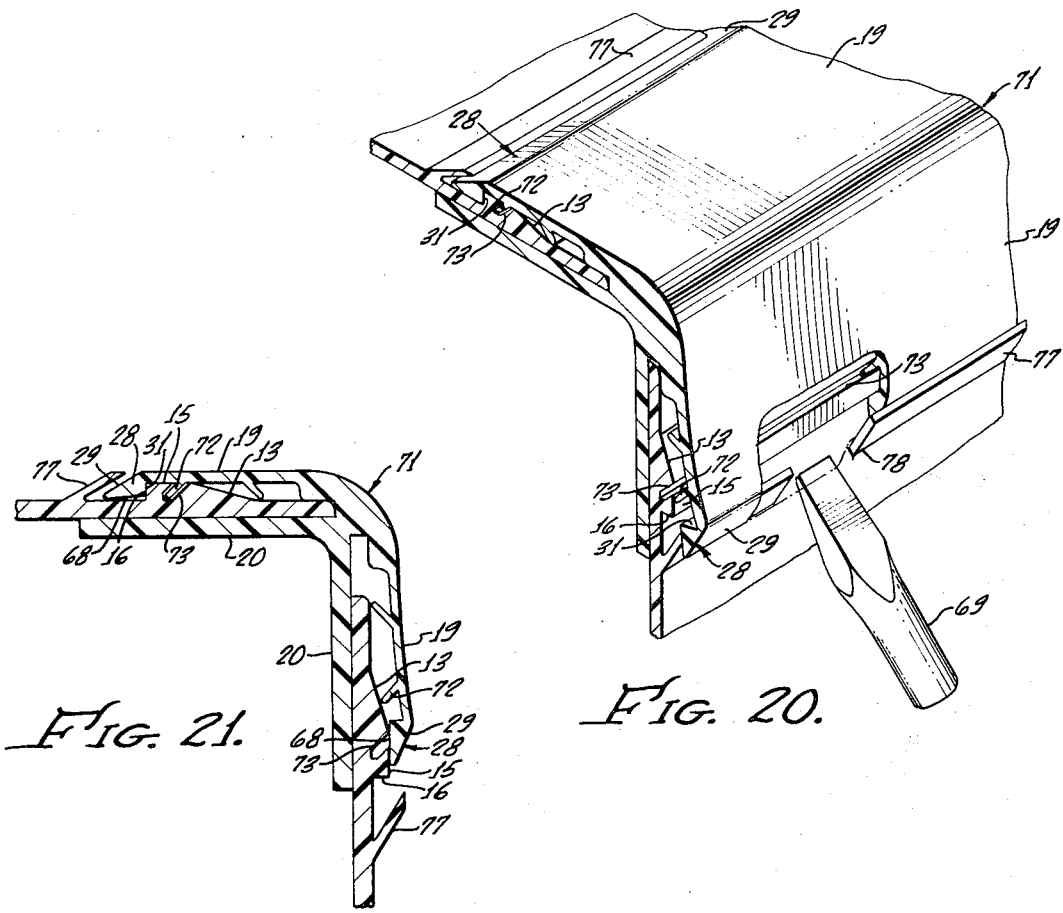
Fig. 20.
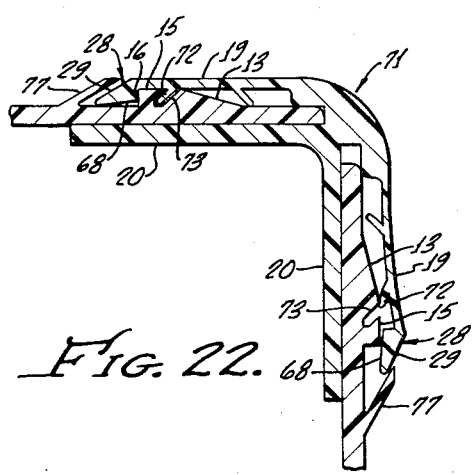
Fig. 21.
Fig. 22.
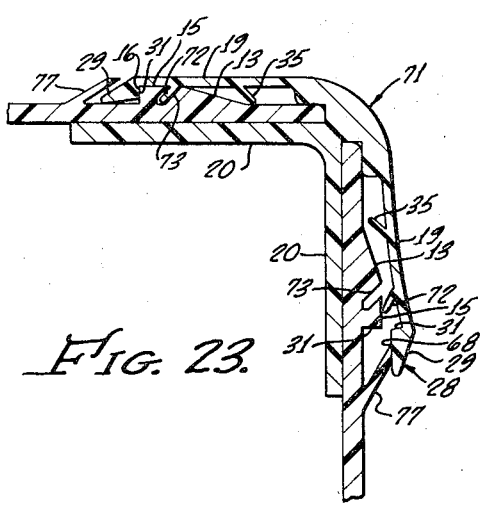
Fig. 23.
INVENTORS.
RAYMOND HENSLEY
IDA F. HENSLEY
BY
ATTORNEYS.

3,768,846

INTERLOCKING JOINT

BACKGROUND OF THE INVENTION

1. Field of the Invention

This invention pertains to an interlocking joint.

2. Description of Prior Art

There have been many prior proposals for interlocking joints intended to hold together components of various structural assemblies without the use of fasteners. Commonly these joint constructions include interengageable shoulders and frequently are made from sheet metal, such as the designs illustrated in U.S. Pat. Nos. 1,934,330 and 2,147,775. While many of these prior designs have served limited purposes effectively, none has met all the requirements of a universal type of interconnecting seam. For example, many of the prior designs lack strength to withstand substantial loading that may be applied to the joint. A structural joint should have a capability of absorbing loads in tension, compression, torsion, shear, vibration, etc. Some of the joint constructions may not be releasable once the parts have become locked together. Also, excessive force may be necessary in moving the mating parts to the assembled position of the joint. Another problem has involved cost of manufacture, as many joint constructions are not adapted for low-cost construction out of plastic or otherwise.

The alternative of a bonded joint provides an economical attachment, but one which is weak when under combined tension and torsion. The application of a small eccentric load will cause the joint to fail.

SUMMARY OF THE INVENTION

The present invention provides an improved joint which solves the above-enumerated difficulties and produces a joint of superior characteristics using neither fasteners nor bonding. It is adapted to be made from plastic, which may be accomplished economically by extrusion or injection molding. One portion of the joint includes a member having a flat forward end with a rounded outer edge and an inclined ramp extending upwardly from the principal surface of the member to a short flat surface at the upper end of the ramp, behind which is a right-angled shoulder. The other member defines an opening adapted to receive the edge portion of the first member. This opening is provided by a first flange having a flat upper surface. A second flange connects to the first flange at a base portion and extends outwardly parallel to it. The second flange is relatively thick adjacent the base so as to define a narrow inner portion of the opening. Outwardly of this, the second flange is bendable, being thinner than the first flange. Consequently, the second flange is resilient and can act as a spring. At its outer edge, there is a beveled outer surface, a rounded forward edge and a bead which, at its rearward face, provides a right-angle shoulder. A lip is provided on the intermediate portion of the bendable second flange, this being inclined toward the first and toward the inner end of the opening.

When the parts are mated, the first member merely is inserted into the opening in the second with a straight parallel push. Its flat undersurface engages the flat surface of the first flange, helping to hold the parts in alignment. Also, as the first member enters the opening, the lip engages its forward portion and helps hold it against the flat surface. As the outer edge of the second flange reaches the ramp, it slides up the ramp, deflecting the resilient intermediate portion of the second flange. Ultimately, the shoulder of the second flange reaches the shoulder of the first member, which permits the second flange to return to its free position as its shoulder snaps into place behind the shoulder of the first member. This secures the two components of the joint.

The joint may be made releasable by providing a means to hold the flanges apart after the forward end of the second flange has been pried upwardly away from the shoulder of the first member. This holding means may be provided by a deflectable element on the first member rearwardly of the shoulder, which inclines forwardly to overlap the forward end of the second flange when the joint is mated. Upon separation, the forward end of the second flange rests upon this element to hold the shoulders apart. The deflectable element may be provided by discrete tabs or by a continuous lip. In the latter event, a notch is provided to give access to the forward end of the second flange in permitting release of the joint. Another means for holding the shoulders apart for permitting separation of the joint may be provided by a forwardly projecting deflectable lip on the second flange adapted to enter an inclined opening at the upper end of the ramp. When the shoulders are pried apart, the forwardly projecting lip rests upon the surface at the upper end of the ramp to hold the shoulders in the separated position. A combination of both releasing arrangements may be incorporated in a single joint.

Each section of the joint consists of only one part. The contour and thickness of each joint element are constant throughout its length, giving a basically strong construction. The only relatively thin portion acts as a spring and becomes a simple tension link when the joint is locked.

The joint is adapted for constructing a variety of items, such as fences, garage doors and boxes. In such constructions, there may be included flat panels which incorporate the male portion of the joint, with interconnecting strips that define the receptacle portions of the joint. The strips may have portions in different planes to provide corners or means to attach together panels positioned in different planes. A wide variety of structures and shapes can be assembled from standard panel and connecting strip components. The deflectable element always is positioned on the outside of the joint, assuring free operation and facilitating inspection of the joint. In any such assembly, repairs are easily effected by replacing only the defective components. For example, a damaged interconnecting strip may be replaced by a new one, but the old panels are retained.

When the joint elements are made by extrusion, the extruded elements are identical. This results in close tolerances with a tight connection at the joint.

BRIEF DESCRIPTION OF THE DRAWINGS

FIG. 5 is a perspective view, partially broken away, of a box constructed in accordance with this invention;

FIG. 6 is an enlarged fragmentary perspective view illustrating a corner portion of the box of FIG. 5;

FIG. 12 is a fragmentary perspective view of a joint incorporating a releasing means;

FIG. 13 is a sectional view of the joint of FIG. 12 with one section of the joint secured and the other being moved toward the mated position;

FIG. 14 is a view similar to FIG. 13 but with the other portion of the joint moved further toward the mated position;

FIG. 15 is a sectional view of the structure of FIGS. 13 and 14 with a section of the joint in the released position;

FIG. 20 is a fragmentary perspective view of a joint incorporating both types of release arrangements;

FIG. 21 is a sectional view of the arrangement of FIG. 20 with one section of the joint secured and the other being moved toward the mated position;

FIG. 22 is a view similar to FIG. 21 with the other portion of the joint moved further toward the mated position; and FIG. 23 is a sectional view of the structure of FIGS. 21 and 22 with a section of the joint in the release position.

DESCRIPTION OF THE PREFERRED EMBODIMENTS

Figure 1:
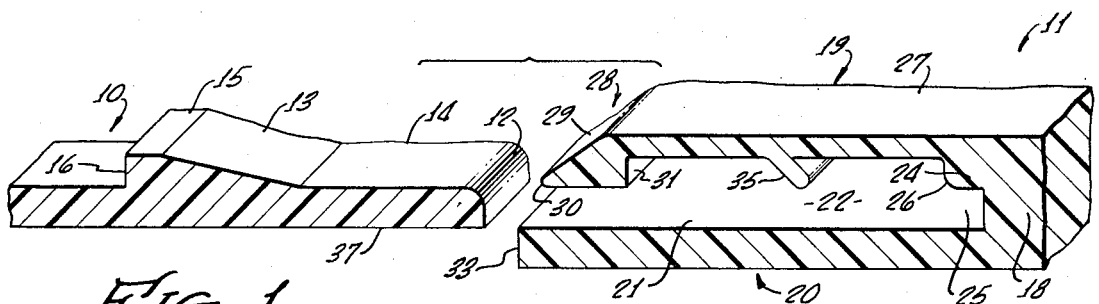
FIG. 1 is a sectional view of the two components of the joint of this invention in the separated position.
Figure 2:
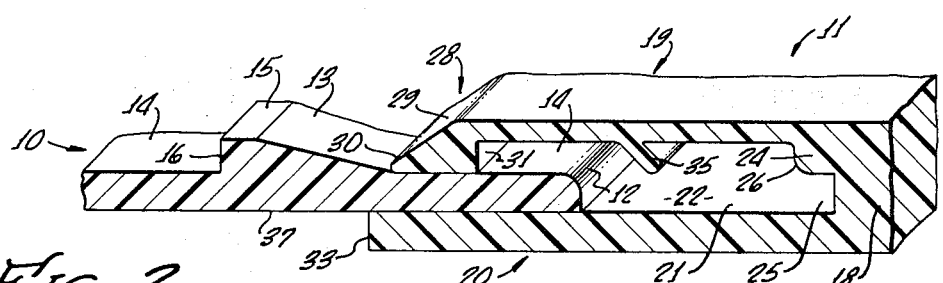
FIG. 2 is a view of the arrangement of FIG. 1 at the beginning of the mating of the joint.
Figure 3:
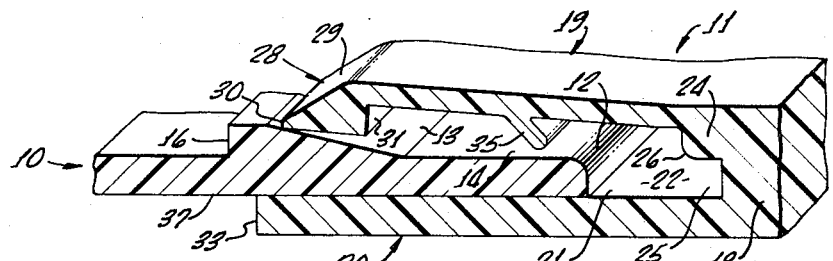
FIG. 3 is a view similar to FIG. 2 with the parts further moved toward the mated position.
Figure 4:
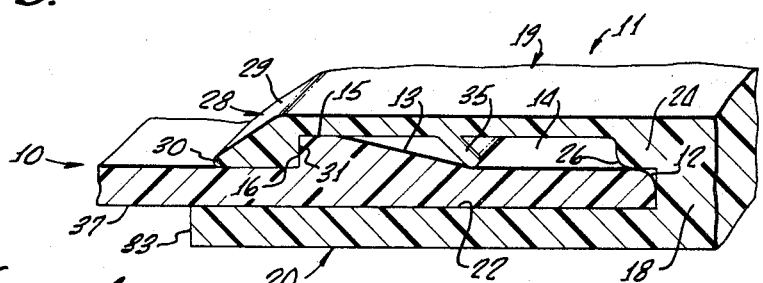
FIG. 4 is a sectional view of the joint in the fully mated position.

The joint construction of this invention is adapted to a wide variety of uses, such as securing together plastic members 10 and 11 shown in FIGS. 1-4. The member 10, which is a flat panel in the example shown, includes a rounded outer edge 12 inwardly of which is a shallow flat ramp 13 extending upwardly from the principal surface 14 of the panel 10 and away from the outer edge 12. At the top of the ramp 13 is a short flat surface 15 parallel to the panel surface 14. Rearwardly of the surface 15 is a shoulder 16 which is perpendicular to the plane of the panel 10.

The member 11, which is of resilient material, includes a base portion 18 from which extend spaced parallel flange elements 19 and 20, which define an opening 21 between them. The flange element 20 is flat along its upper surface 22. The other flange element 19 includes a relatively thick part 24 adjacent the base 18 so as to provide a narrow inner portion 25 of the opening 21 having substantially the thickness of the forward end of the panel 10. A rounded corner 26 is provided at the forward edge of the relatively thick portion 24 of the flange 19 at the entrance to the narrow inner portion 25 of the opening.

The central portion 27 of the flange element 19 is relatively thin, having substantially less thickness than that of the flange element 20.

At its forward edge, the flange 19 includes a bead 28 that projects toward the flange 20. The bead 28 has a beveled upper surface 29, a rounded outer edge 30 and an inner shoulder 31, which is perpendicular to the plane of the flange 19. The bead 28 defines the entrance 32 to the opening 21, which is substantially the same thickness as the forward portion of the panel 10. The flange 19 is shorter than the flange 20 so that the forward rounded edge 30 does not extend outwardly as far as the forward edge 33 of the flange 20.

Near the middle of the central portion 27 of the flange element 19 is a lip 35. The later element inclines downwardly and rearwardly from the inner surface of the flange element 19, extending toward the upper surface 22 of the flange element 20.

When the joint is to be assembled, the members 10 and 11 are advanced relatively toward each other. Initially, the flat undersurface 37 of the panel 10 is held against the flat upper surface 22 of the flange element 20 of the member 11, which aligns the joint elements as the parts are moved toward the mated position. Then, the forward end of the panel 10 passes through the entrance 32 of the opening 21, moving beneath the bead 28. With the forward edge 12 of the panel 10 and the forward edge 30 of the member 11 being convexly rounded, entry of the panel 10 into the opening 21 is facilitated.

Additional relative movement of the members 10 and 11 brings the forward portion of the panel 10 beneath the lip 35 of the member 11. The rearward inclination of the lip 35 allows the forward end of the panel 10 to move beneath it without interference. The lip 35 is sufficiently long so that it presses on the upper surface 14 of the panel 10, helping to urge the lower surface 37 of the panel 10 against the upper surface 22 of the flange element 20. This assists in keeping the joint parts aligned as the mating progresses.

Ultimately, the forward edge 30 of the flange element 19 reaches the ramp 13 of the panel 10 and begins to slide up the ramp surface. This causes the flange element 19 to become deflected outwardly as the relatively thin intermediate portion 27 bends. The reaction produced does not cause the flange 20 to bend because this element is relatively thick. The edge 30 slides all the way up the ramp 13 until the bead 28 is resting upon the upper surface 15 at the rearward end of the ramp.

As the bead 28 travels to the top of the ramp 13, the forward edge 12 of the panel 10 reaches the inner portion 25 of the opening 21. It enters the inner portion 25 readily because the panel 10 is maintained in alignment with the opening 21 and not allowed to tilt relative to it. This results from the force exerted by the resilient flange 19 pressing the undersurface 37 of the panel 10 against the flat upper surface 22 of the flange 20. The rounded edge 12 of the panel 10 will slide easily over the rounded edge 26 of the flange element 19 at the entrance to the portion 25 of the opening 21.

Finally, the rearward shoulder 31 of the bead 28 reaches the rearward shoulder 16 of the panel 10. This allows the flange element 19 to spring back toward the flange element 20 as the shoulder 31 fits next to the shoulder 16 of the panel 10. This completes the assembly of the joint, which is accomplished merely be sliding the parts 10 and 11 relatively toward each other. Obviously, the joint is held against separation by the interengagement of the shoulders 16 and 31.

The characteristics of the joint are controlled by the length and thickness of the flange 19. The strength of the joint will be reduced if the central part 27 of the flange 19 is made too thin or if the flange is too long. On the other hand, a short flange 19 or one that is too thick will increase the effort required to move the joint to the mated position. With proper proportioning, the joint has exceptional strength and at the same time can be secured through the application of relatively light forces urging the panels together. In one example, a joint requiring only one-fourth pound per inch to close will withstand a tension load of 150 pounds per inch. Not only will the joint withstand high loads in tension, but also it is very resistant to other forms of loading, such as from compression, torque and shear forces.

The joint of this invention is adapted for a variety of purposes, one of which is in the production of a box, such as shown in FIGS. 5 through 11. This box is made up of flat panels which engage connecting strips having the receptacle joint portion of the member 11 previously described. Thus, in the box shown, there are flat top panels 40, side panels 41 and end panels 42. These are engaged by horizontal edge strips 43 and 44 and vertical edge strips 45. There are, in addition, intermediate strips 46 and 47 interconnecting the top panels 40. Vertical connecting strips 48 join the side panels 41 together as well as the end panels 42.

Figure 7:
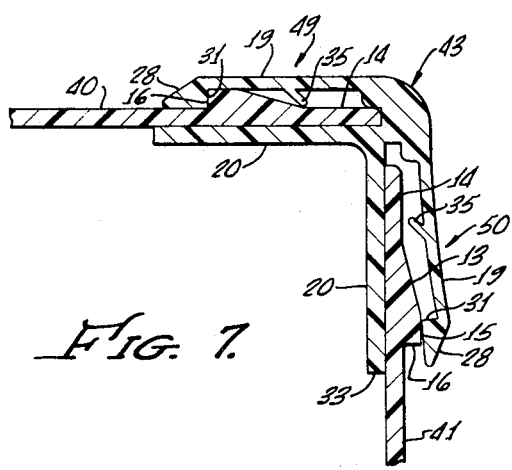
FIG. 7 is a sectional view of a corner portion of the box with one section of the joint secured and the other being moved to the mated position.
Figure 8:
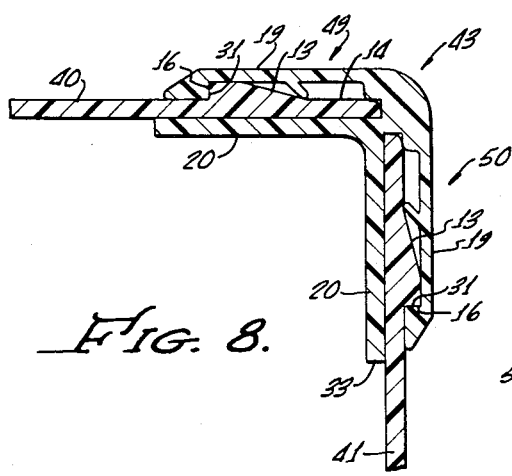
FIG. 8 is a view similar to FIG. 7 but with both sections of the joint fully mated.

As shown in enlarged detail in FIGS. 7 and 8, the member 43 includes two outwardly facing edge sections 49 and 50 at right angles to each other, each of which defines a receptacle portion of the joint. Each top panel 40 is provided with a ramp 13 and shoulder 16 at its outer edge to mate with the receptacle joint portion in the section 49 of the member 43. Similarly, the edge portion of the panel 41 includes a ramp 13 and shoulder 16 for engaging the receptacle part of the section 50 of the member 43. The other edge member 44 is the same as that of the member 43 except that it is shorter. Consequently, its engagement with the panels 40 and 42 is similar to that shown in FIG. 3. At their adjacent ends, the edge members 43 and 44 are beveled to form a mitered corner.

Figure 9:
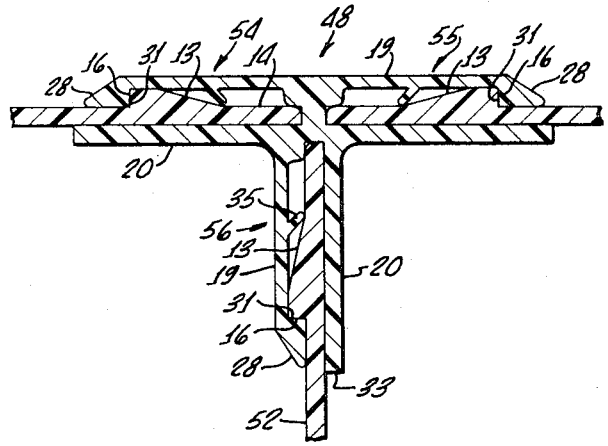
FIG. 9 is a sectional view of the assembly of three panels in two different planes with a T-shaped interconnecting strip.

In the example illustrated, there are internal longitudinal and transverse divider panels 52 and 53 in the box. Consequently, in order to engage these internal panels, the connecting member 48 is T-shaped, as shown in FIG. 9. This means that it has oppositely facing sections 54 and 55 in one plane for engaging the edges of the two adjoining side panels 41. The third section 56 is perpendicular to the other two and defines the joint receptacle portion to receive the properly contoured edge of the internal panel 52. A similar arrangement is provided for the end panels 42.

Figure 10:
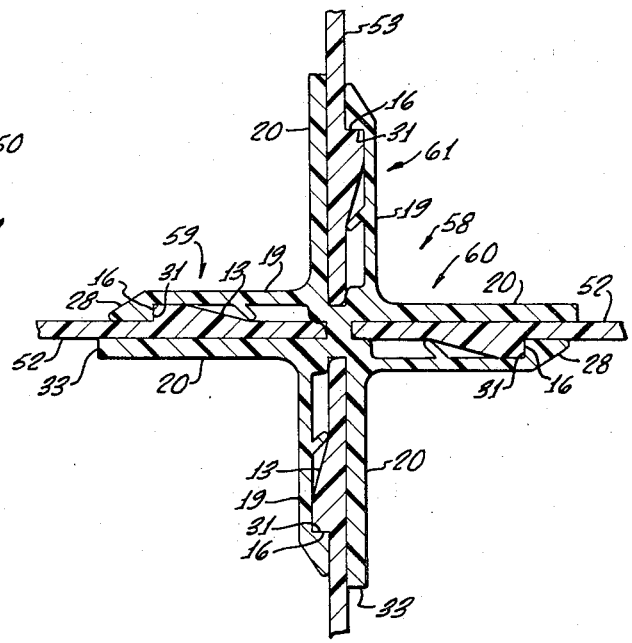
FIG. 10 is a sectional view of the assembly of four panels with a cruciform interconnecting strip.

At the central portion of the box, perpendicular to the connecting member 47 and intermediate the two longitudinal connecting elements 46, is a cruciform connecting member 58 (see FIG. 10). This unit provides two oppositely facing receptacle elements 59 and 60 in one plane, and an additional two oppositely facing receptacle portions 61 and 62 in a second plane at right angles to the first. These receive and retain the inner edges of the internal panels 52 and 53.

Figure 11:
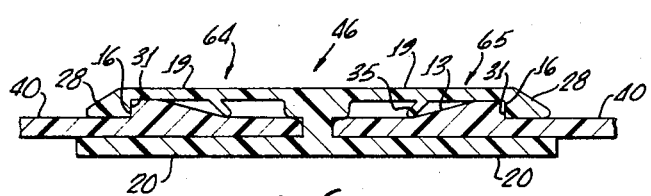
FIG. 11 is a sectional view of the panels assembled with a connecting strip which is in one plane.
Figure 16:
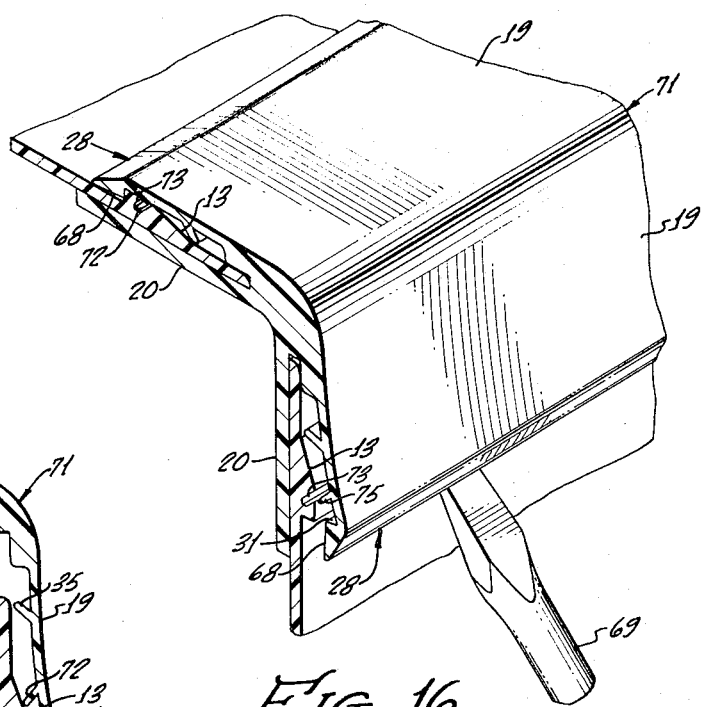
FIG. 16 is a fragmentary perspective view of a joint having a different means for holding the parts in the released condition.
Figure 17:
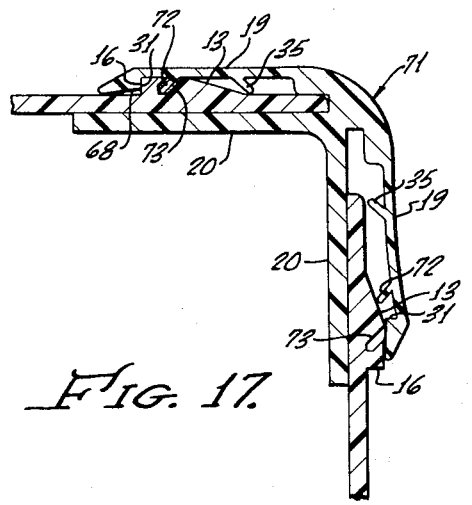
FIG. 17 is a sectional view of the arrangement of FIG. 16 with one section of the joint secured and the other being moved toward the mated position.
Figure 19:
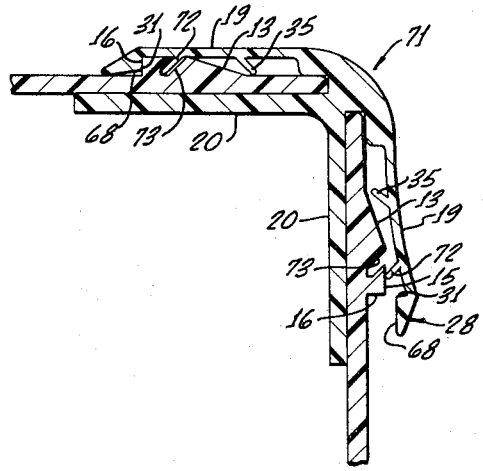
FIG. 19 is a sectional view of the structure of FIGS. 17 and 18 with a section of the joint in the released position.
Figure 18:
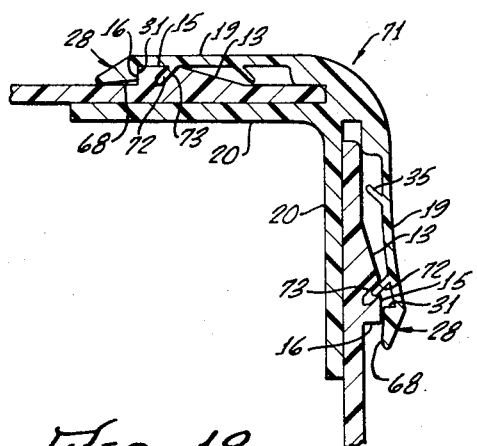
FIG. 18 is a view similar to FIG. 17 with the other portion of the joint further advanced toward the mated position.

Along the top of the box, the interconnecting strips 46 are of the type shown in FIG. 11. Here, the member 46 includes two receptacle portions 64 and 65 all in a single plane. They are adapted to receive and retain the adjacent edges of the panels 40 to be joined. The shorter connecting strip 47 is similar in cross section to the strip 46.

While the above-described joint is of exceptional strength and quite easy to assemble to the mated condition, it is not readily separated. The shoulders are not adapted to be pried apart by a hand tool because they will immediately return to the mated position when the tool is removed. Separation of the shoulders at a localized area will leave the remainder of the joint secured and the parts still locked together. Consequently, the joint of FIGS. 1–11 is particularly suited for permanent or semipermanent attachments. This may be a significant advantage in preventing tampering with the contents of a container or otherwise avoiding separation of a joint which should always be in the mated condition. In other instances, however, it is preferable to have a separable joint. This may be, for example, for a removable top, or where a container is to be set up to ship a quantity of goods to a destination, thereafter to be knocked down and returned in a compact flat condition. The joint arrangement shown in FIGS. 12–15 is such a releasable type. Here, the receptacle portion of the device is identical to that of the unit 11 as exemplified in the edge connecting strips 43 described above. The panel 66 defining the male portion of the joint is also similar to that of the unit 10, including an inclined ramp 13 and a short upper surface 15 rearwardly of which is a right-angled shoulder 16. Unlike the panel 10, there are spaced tabs 67 positioned rearwardly of the shoulder 16 which extend at an appropriate angle, such as 30°, away from the surface of the panel 66.

When the joint of FIGS. 12–15 is moved to the assembled position, the bead 28 of the receptacle enters the space between the tabs 67 and the shoulder 16 when the flange 19 snaps into position in locking the joint. The bead 28 then is received between the shoulder 16 and the tabs 67, which overlap the outer surface 29. The tabs 67 contribute to the overall strength of the joint by resisting forces tending to displace the shoulder 31.

In facilitating assembly of the joint, the undersurface 68 of the bead 28 is given a taper to the rear toward the shoulder 31. In other words, the surface 68 inclines at a shallow angle, such as 5°, from its outer end toward the flange 19. In the previous embodiment, this surface of the bead is parallel to the flange 19 rather than being tapered. The inclination of the surface 68 allows the bead to move inwardly toward the flange 20 as the shoulder 31 approaches the shoulder 16. This, in turn, permits the bead to fit beneath the tabs 67 without deflecting them as the joint is assembled. Deflection of the tabs 67 is undesirable because it adds to the force required in assembling the joint.

When the joint is to be separated, the bead 28 merely is pried away from the panel 66 by an appropriate tool, such as a screwdriver 69. When this occurs, the bead 28 deflects the tabs 67 outwardly as it is freed from the shoulder 16. Thereafter, the bead 28 slips over the tops of the tabs 67 and rests upon the outer edge surfaces 70 of the tabs. This holds the flange 19 in a deflected position with the shoulder 31 free of the shoulder 16. It is a simple matter than to slide the panel 66 out of the receptacle portion of the joint. The bead 28 is of sufficient width so that, before the outer end 30 of the bead passes the tabs 67, the shoulder 31 has moved outwardly from the shoulder 16 and the joint will not reengage.

The upper edges 70 of the tabs 67 are spaced the same height above the flat upper panel surface 15 as the outer surface of the flange 19 when the joint is assembled. This height is adequate to hold the shoulder 16 and 31 separated so that the joint can be disassembled. Also, the tabs 67 then do not project outwardly beyond the other joint components when the joint is assembled, and so are not vulnerable to damage.

Instead of the external tabs for allowing release of the joint, this feature may be incorporated in the internal portion of the joint, as illustrated in FIGS. 16–19. Here, the member 71 defining the receptacle portion includes, in addition, a relatively thin lip 72 extending from the undersurface of the deflectable flange 19 and inclined forwardly toward the shoulder 31.

In the other portion of the joint, there is a slot or groove 73 inclined inwardly and rearwardly from approximately the juncture of the ramp 13 and the upper flat surface 15. The slot 73 is at the same angle as the lip 72 and dimensioned to receive it with some clearance at the sides.

With the joint is assembled, the lip 72 enters the slot 73 as the bead 28 slides across the surface 15 at the top of the ramp 13. The tapered undersurface 68 of the bead 28 allows the lip 72 to enter the slot 73 without appreciable deflection. The lip 72 resists relative lateral movement of the shoulders 16 and 31, and so adds to the strength of the joint.

When the joint of FIGS. 16–19 is to be separated, the bead 28 is pried upwardly to move the shoulder 31 away from the shoulder 16 of the panel. As this takes place, the lip 72 is deflected and moved out of the slot 73. As soon as it has cleared the slot, the lip 72 again assumes its free forwardly projecting position. This causes it to engage the flat surface 15 at the top of the ramp 13, holding the shoulders 16 and 31 in the released position (see FIG. 19). Consequently, the joint may be separated without any interference from the shoulders 16 and 31.

The embodiment of FIGS. 20–23 provides a combination of the internal and external means for holding the shoulders separated so that the joint can be released. This can help assure releasability of the joint in the event of damage to either of the releasing elements. Also, the joint gains added strength from the inclusion of both the overlapping elememt on the outside of the joint and the internal tab in the slot in the panel. The latter member includes a flange 77 projecting upwardly and forwardly toward the shoulder 16 to serve the same purpose as the tabs 67 in the embodiment of FIGS. 12–15. There is a gap 78 in the flange 77 to permit the releasing tool 69 to enter for prying the bead 28 upwardly. Both the lip 72 and the flange 77 are deflected as the joint is released, then serving to hold the shoulders 16 and 31 separated.

The flange 77 contributes more strength to the joint than the smaller tabs 67. The flange 77 also protects the forward edge of the flange 19, helping to prevent damage to the joint. When the flange 77 in included, the part is particularly adapted to construction by extrusion, while with the tabs 67 it can be injection molded. Obviously, the flange 77 may be used with the embodiment of FIGS. 12–15, and the tabs 67 may be substituted in the version of FIGS. 20–23.

The foregoing detailed description is to be clearly understood as given by way of illustration and example only, the spirit and scope of this invention being limited solely by the appended claims.

What is claimed is:

1. A device for attaching together a first member having an outer edge and a second member comprising means on one side of said first member defining
    a ramp adjacent said outer edge of said first member,
    said ramp being inclined inwardly relative to said outer edge,
    and a shoulder inwardly of said ramp, and means on said second member defining an opening adapted to receive said outer edge of said first member, said opening being defined by a first element and a second element,
    said first element being relatively rigid and resistant to bending, said second element having a shoulder extending toward and opposed to said first element, said second element being resilient and deflectable inwardly of said shoulder thereof,
        whereby upon relative advancement of said first member toward said second member said ramp deflects said second element and permits said shoulders of said first and second members to be brought into adjacency.

2. A device as recited in claim 1 in which said first and second members are of plastic material, said second member being unitary, with said second element inwardly of said shoulder thereof being thinner than said first element for thereby causing said second element to be resilient and deflectable and said first element to be relatively rigid.

3. A device for attaching together a first member having an outer edge and a second member comprising means on one side of said first member defining
    a ramp adjacent said outer edge of said first member,
    said ramp being inclined inwardly relative to said outer edge,
    and a shoulder inwardly of said ramp,
    means on said second member defining an opening adapted to receive said outer edge of said first member,
    said opening being defined by a first element and a second element,
    said second element having a shoulder extending toward said first element,
    said second element being resilient and deflectable inwardly of said shoulder thereof,
        whereby upon relative advancement of said first member toward said second member said ramp deflects said second element and permits said shoulders of said first and second members to be brought into adjacency, and means for holding said shoulders apart upon separation of said shoulders of said first and second members.

4. A device as recited in claim 3 in which said means for holding said shoulders apart includes means for holding said second element in a portion where it is deflected away from said first element and said shoulders are remote from each other.

5. A device as recited in claim 4 in which said means for holding said second element in a position where it is deflected away from said first element is carried by said first member and positioned inwardly of said shoulder of said first member.

6. A device as recited in claim 4 in which said means for holding said second element in a position where it is deflected away from said first element is carried by said second member and positioned inwardly of said shoulder of said second member.

7. A device as recited in claim 1 in which said first member includes a panel portion extending from the base of said ramp to said outer edge.

8. A device as recited in claim 7 in which said opening of said second member includes an inner relatively narrow portion for substantially complementarily receiving said outer edge and an intermediate portion providing a surface of said second element spaced from said outer edge when said outer edge is received in said opening.

9. A device as recited in claim 8 in which
said outer edge of said first member includes a convexly rounded corner,
the outer edge of said second element includes a convexly rounded corner,
and the entrance to said inner relatively narrow portion of said opening includes a convexly rounded corner,
for facilitating said relative advancement of said first member toward said second member.

10. A device for attaching together a first member having
an outer edge and a second member comprising
means on one side of said first member defining
a ramp adjacent said outer edge of said first member,
said ramp being inclined inwardly relative to said outer edge,
a panel portion extending from the base of said ramp to said outer edge,
and a shoulder inwardly of said ramp,
and means on said second member defining an opening adapted to receive said outer edge of said first member,
said opening being defined by a first element and a second element,
said second element having a shoulder extending twoard said first element,
said second element being resilient and deflectable inwardly of said shoulder thereof,
whereby upon relative advancement of said first member toward said second member said ramp deflects said second element and permits said shoulders of said first and second members to be brought into adjacency,
said opening of said second member including an inner relatively narrow portion for substantially complementarily receiving said outer edge,
said outer edge of said first member including a convexly rounded corner,
the outer edge of said second element including a convexly rounded corner,
and the entrance to said inner relatively narrow portion of said opening including a convexly rounded corner,
for facilitating said relative advancement of said first member toward said second member,
said second element including means intermediate said shoulder thereof and said relatively narrow portion of said opening extending toward said first element for engagement with said panel portion when said panel portion enters said opening for aligning said first and said second members and directing said outer edge of said first member toward said relatively narrow portion of said opening.

11. A device as recited in claim 10 in which said last-mentioned means includes a deflectable member inclined rearwardly away from said shoulder of said second element and toward said relatively narrow portion of said opening.

12. A device as recited in claim 10 in which said first element extends outwardly beyond said second element for facilitating alignment of said first and second members when said first and second members are moved relatively toward each other for attachment.

13. A device as recited in claim 12 in which said first member has a substantially planar surface on the side thereof opposite from said one side, and in which said first element has a substantially planar surface adjacent said second element for engagement with said substantially planar surface of said first member for aligning said first and second members.

14. A device for attaching together a first member having an outer edge and a second member comprising
means on one side of said first member defining
a ramp adjacent said outer edge of said first member,
said ramp being inclined inwardly relative to said outer edge,
a panel portion extending from the base of said ramp to said outer edge,
and a shoulder inwardly of said ramp,
means on said second member defining an opening adapted to receive said outer edge of said first member,
said opening being defined by a first element and a second element,
said second element having a shoulder extending toward said first element,
said second element being resilient and deflectable inwardly of said shoulder thereof,
whereby upon relative advancement of said first member toward said second member said ramp deflects said second element and permits said shoulders of said first and second members to be brought into adjacency,
said opening of said second member including an inner relatively narrow portion for substantially complementarily receiving said outer edge,
and means on said first member spaced inwardly from said shoulder thereof and inclined toward said shoulder for overlapping the outer edge of said second element when said shoulders are in said interengagement, said last-mentioned means being deflectable for permitting separation of said shoulders and for thereafter supporting said outer edge of said second element for maintaining said shoulders disengaged and allowing separation of said first and second elements.

15. A device as recited in claim 14 in which said second element includes a surface adjacent said first element extending from said shoulder to said outer edge, said surface being inclined outwardly toward said first element.

16. A device as recited in claim 15 in which said surface is so inclined at approximately 5°.

17. A device as recited in claim 15 in which said second element includes a beveled surface remote from said first element and extending to said outer edge.

18. A device as recited in claim 15 in which said last-mentioned means is defined by a plurality of discrete tabs on said first member.

19. A device as recited in claim 15 in which said last-mentioned means is defined by a lip on said first member.

20. A device as recited in claim 19 in which said lip has an opening therein for permitting access to said outer edge of said second element and permitting said second element to be deflected so as to separate said shoulders.

21. A device for attaching together a first member having an outer edge and a second member comprising means on one side of said first member defining
   a ramp adjacent said outer edge of said first member,
      said ramp being inclined inwardly relative to said outer edge,
   a panel portion extending from the base of said ramp to said outer edge,
   and a shoulder inwardly of said ramp,
and means on said second member defining an opening adapted to receive said outer edge of said first member,
   said opening being defined by a first element and a second element,
   said second element having a shoulder extending toward said first element,
   said second element being resilient and deflectable inwardly of said shoulder thereof,
      whereby upon relative advancement of said first member toward said second member said ramp deflects said second element and permits said shoulders of said first and second members to be brought into adjacency,
   said opening of said second member including an inner relatively narrow portion for substantially complementarily receiving said outer edge,
   said second element including means inwardly of said shoulder thereof inclined forwardly toward said shoulder thereof and inwardly toward said first element,
   said first member having a recess therein adjacent the upper portion of said ramp,
      said recess being inclined at substantially the same angle as that of said means inwardly of said shoulder,
         whereby said recss is adapted to receive said means when said shoulders are in interengagement,
   said first member having a surface intermediate said ramp and said shoulder thereof for engagement by said means inwardly of said shoulder upon separation of said shoulders for maintaining said shoulders disengaged.

22. A device as recited in claim 21 in which said second element includes a surface adjacent said first element extending from said shoulder to said outer edge, said surface being inclined outwardly toward said first element.

23. A device as recited in claim 22 in which said surface is so inclined at approximately 5°.

24. A device as recited in claim 21 in which said means inwardly of said shoulder is a lip.

* * * * *

PO-1050
(5/69)

UNITED STATES PATENT OFFICE
CERTIFICATE OF CORRECTION

Patent No. 3,768,846          Dated October 30, 1973

Inventor(s) Raymond Hensley and Ida F. Hensley

It is certified that error appears in the above-identified patent and that said Letters Patent are hereby corrected as shown below:

In column 9, line 6 (Claim 4, line 3): change the word "portion" to read ---position---.

In column 9, line 57 (Claim 10, line 18): change the misspelled word "twoard" to read ---toward---.

Signed and sealed this 9th day of July 1974.

(SEAL)
Attest:

McCOY M. GIBSON, JR.
Attesting Officer

C. MARSHALL DANN
Commissioner of Patents